United States Patent
Xie et al.

(10) Patent No.: US 11,026,288 B2
(45) Date of Patent: Jun. 1, 2021

(54) DISCONTINUOUS RECEPTION METHOD, TERMINAL, AND NETWORK DEVICE

(71) Applicant: Huawei Technologies Co., Ltd., Guangdong (CN)

(72) Inventors: Yong Xie, Shenzhen (CN); Yalin Liu, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 7 days.

(21) Appl. No.: 16/547,988

(22) Filed: Aug. 22, 2019

(65) Prior Publication Data

US 2019/0380166 A1    Dec. 12, 2019

Related U.S. Application Data

(63) Continuation of application No. PCT/CN2018/075440, filed on Feb. 6, 2018.

(30) Foreign Application Priority Data

Feb. 24, 2017   (CN) .......................... 201710103838.7

(51) Int. Cl.
*H04L 5/00* (2006.01)
*H04W 76/28* (2018.01)
(Continued)

(52) U.S. Cl.
CPC .......... *H04W 76/28* (2018.02); *H04W 24/08* (2013.01); *H04W 52/0225* (2013.01)

(58) Field of Classification Search
CPC ..... H04W 76/28; H04W 76/27; H04W 88/02; H04W 48/12

(Continued)

(56) References Cited

U.S. PATENT DOCUMENTS

| 2009/0061851 A1* | 3/2009 | Kitazoe ............. H04W 52/0216 455/426.1 |
| 2011/0205928 A1* | 8/2011 | Pelletier ................ H04W 24/00 370/252 |

(Continued)

FOREIGN PATENT DOCUMENTS

| CN | 101567770 A | 10/2009 |
| CN | 101827426 A | 9/2010 |

(Continued)

OTHER PUBLICATIONS

MediaTek Inc., DRX enhancement for NR. 3GPP TSG-RAN2#96 meeting Reno, USA, Nov. 14-18, 2016, R2-168590, 1 page.

(Continued)

*Primary Examiner* — Asad M Nawaz
*Assistant Examiner* — Jason A Harley
(74) *Attorney, Agent, or Firm* — Womble Bond Dickinson (US) LLP (57) ABSTRACT

A discontinuous reception method, a terminal, and a network device are provided. The method includes: obtaining, by a terminal, discontinuous reception DRX parameter information corresponding to configuration parameter information supported by the terminal; and enabling DRX by using the obtained DRX parameter information. The method is applied to a communications system, the communications system supports N groups of configuration parameters, and each group of configuration parameters is corresponding to a group of discontinuous reception DRX parameters. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger (Continued)

A network device determines DRX parameter information corresponding to configuration parameter information supported by a terminal — S301

The network device sends, to the terminal, the DRX parameter information corresponding to the configuration parameter information — S302

The terminal enables DRX by using the obtained DRX parameter information — S303 system capacity, a lower latency, higher network reliability, and better network availability.

20 Claims, 5 Drawing Sheets (51) Int. Cl.
*H04J 3/00* (2006.01)
*H04W 4/70* (2018.01)
*H04W 24/08* (2009.01)
*H04W 52/02* (2009.01)

(58) Field of Classification Search
USPC .......................................................... 370/252
See application file for complete search history.

(56) References Cited

U.S. PATENT DOCUMENTS

| | | | |
|---|---|---|---|
| 2012/0120843 A1 | 5/2012 | Anderson et al. | |
| 2012/0263051 A1* | 10/2012 | Willars | H04W 76/20 370/252 |
| 2014/0247742 A1* | 9/2014 | Lee | H04W 24/10 370/252 |
| 2017/0019820 A1 | 1/2017 | Das | |
| 2017/0026861 A1 | 1/2017 | Tseng et al. | |
| 2017/0202052 A1* | 7/2017 | Xu | H04W 76/20 |

FOREIGN PATENT DOCUMENTS

| | | |
|---|---|---|
| CN | 102932882 A | 2/2013 |
| CN | 103428773 A | 12/2013 |
| CN | 105472716 A | 4/2016 |
| WO | 2013171577 A1 | 11/2013 |

OTHER PUBLICATIONS

Ericsson, DRX Enhancements for NR. 3GPP TSG-RAN WG2 #96 Reno, Nevada, USA, Nov. 14-18, 2016, R2-168662, 4 pages.
Ericsson, DRX in NR for Multi Connectivity. 3GPP TSG-RAN WG2 #96 Reno, Nevada, USA, Nov. 14-18, 2016, R2-168663, 3 pages.
Intel Corporation:"Dynamic C-DRX configuration in NR", 3GPP Draft; R2-1701722, vol. RAN WG2, No. Athens,Greece; Feb. 13, 2017-Feb. 17, 2017, Feb. 12, 2017, XP051212295, 4 pages.
Qualcomm Incorporated: "Multiple Numerologies—MAC Aspects", 3GPP Draft; R2-1701767, vol. RAN WG2, No. Athens, Greece; Feb. 13, 2017-Feb. 17, 2017, Feb. 12, 2017, XP051212334, 2 pages.
Huawei et al: "DRX with Multiple Numerologies", 3GPP Draft; R2-1700086, vol. RAN WG2, No. Spokane, Wa; Jan. 17, 2017-Jan. 19, 2017, Jan. 17, 2017, XP051210673, 2 pages.
Intel Corporation:"Dynamic C—DRX configuration in NR", 3GPP Draft; R2-168532, vol. RAN WG2, No. Reno, Nevada, USA; Nov. 14, 2016-Nov. 18, 2016, Nov. 13, 2016, XP051178113, 4 pages.
Qualcomm Incorporated:"Connected Mode DRX Considerations", 3GPP TSG-RAN2#96, R2-168601, Reno, US, Nov. 14-18, 2016. total 2 pages.
CATT:"NR DRX Design", 3GPP TSG-RAN WG2 NR Ad Hoc, R2-1700201, Spokane, USA, Jan. 17-19, 2017. total 4 pages.
InterDigital Communications:"Power Savings for NR", 3GPP TSG-RAN WG2 #97, R2-1701188, Athens, Greece, Feb. 13-17, 2017. total 4 pages.

* cited by examiner

DISCONTINUOUS RECEPTION METHOD, TERMINAL, AND NETWORK DEVICE

CROSS REFERENCE TO RELATED APPLICATIONS

This application is a continuation of International Application No. PCT/CN2018/075440, filed on Feb. 6, 2018, which claims priority to Chinese Patent Application No. 201710103838.7, filed on Feb. 24, 2017. The disclosures of the aforementioned applications are hereby incorporated by reference in their entireties.

TECHNICAL FIELD

This application relates to wireless communications technologies, and in particular, to a discontinuous reception method, a terminal, and a network device.

BACKGROUND

In a long term evolution (LTE) system, service data reception of a terminal may be switched between a continuous reception state and a discontinuous reception state. The terminal is in the continuous reception state when accessing a network, and the terminal may determine, based on a current service status, whether to switch to the discontinuous reception (DRX) state, to reduce power consumption of the terminal. Specifically, after entering the DRX state from the continuous reception state, the terminal first passes a short DRX cycle before entering a long DRX cycle. The long DRX cycle helps prolong a battery usage time of UE, and the short DRX cycle helps the terminal respond more quickly when new data is transmitted.

In the prior art, a set of DRX parameters is preconfigured for the terminal. However, with development of mobile communication, the development of mobile communication in the future needs to support huge mobile data traffic growth, massive device connections, and various new services and application scenarios, and service data reception of the existing terminal cannot meet requirements of more new services and new application scenarios.

SUMMARY

This application provides a discontinuous reception method, a terminal, and a network device, to meet requirements of larger data traffic, more device connections, and various new services and new scenarios.

A first aspect of this application provides a discontinuous reception method, where the method is applied to a communications system, the communications system supports N groups of configuration parameters, N is an integer greater than or equal to 2, and each group of configuration parameters is corresponding to a group of discontinuous reception DRX parameters; and the method includes:

obtaining, by a terminal, discontinuous reception DRX parameter information corresponding to configuration parameter information supported by the terminal; and enabling, by the terminal, DRX by using the obtained DRX parameter information.

Optionally, the obtaining, by a terminal, discontinuous reception DRX parameter information corresponding to configuration parameter information supported by the terminal includes:

obtaining, by the terminal, the configuration parameter information supported by the terminal; and obtaining, by the terminal, the DRX parameter information of the terminal based on the configuration parameter information supported by the terminal and a correspondence between a configuration parameter and a DRX parameter.

In one embodiment, the method further includes:

obtaining, by the terminal, the correspondence between the configuration parameter and the DRX parameter.

In one embodiment, the obtaining, by the terminal, the correspondence between the configuration parameter and the DRX parameter includes:

receiving, by the terminal, the correspondence that is between the configuration parameter and the DRX parameter and that is sent by a network device; or obtaining, by the terminal, the correspondence that is between the configuration parameter and the DRX parameter and that is preconfigured for the terminal.

In one embodiment, the obtaining, by the terminal, the configuration parameter information supported by the terminal includes:

obtaining, by the terminal, the configuration parameter information supported by the terminal and sent by the network device.

In one embodiment, the obtaining, by a terminal, discontinuous reception DRX parameter information corresponding to configuration parameter information supported by the terminal includes:

receiving, by the terminal, the DRX parameter information that is corresponding to the configuration parameter information supported by the terminal and that is sent by a network device.

In one embodiment, if the terminal supports M groups of configuration parameters, the obtaining, by a terminal, discontinuous reception DRX parameter information corresponding to configuration parameter information supported by the terminal includes:

determining, by the terminal as the DRX parameter information of the terminal, DRX parameter information with a minimum DRX parameter value in DRX parameter information corresponding to the M groups of configuration parameters, where M is an integer, and 1<M≤N.

In one embodiment, information about the group of DRX parameters includes one or more of the following: parameter information of a first DRX state, parameter information of a second DRX state, and parameter information of a monitoring interval; and duration of the first DRX state is less than a first preset threshold, duration of the second DRX state is greater than a second preset threshold, and the monitoring interval is used to listen to a control channel of a cell accessed by the terminal.

A second aspect of this application provides a discontinuous reception method, where the method is applied to a communications system, the communications system supports N groups of configuration parameters, N is an integer greater than or equal to 2, and each group of configuration parameters is corresponding to a group of discontinuous reception DRX parameters; and the method includes:

determining, by a network device, discontinuous reception DRX parameter information corresponding to configuration parameter information supported by a terminal; and sending, by the network device to the terminal, the DRX parameter information corresponding to the configuration parameter information supported by the terminal.

In one embodiment, the determining, by a network device, DRX parameter information corresponding to configuration parameter information supported by a terminal includes:

obtaining, by the network device, the configuration parameter information supported by the terminal; and obtaining, by the network device based on the configuration parameter information supported by the terminal and a correspondence between a configuration parameter and a DRX parameter, the DRX parameter information corresponding to the configuration parameter information supported by the terminal.

In one embodiment, the method further includes:

sending, by the network device, the correspondence between the configuration parameter and the DRX parameter to the terminal.

In one embodiment, if the terminal supports M groups of configuration parameters, the determining, by a network device, DRX parameter information corresponding to configuration parameter information supported by a terminal includes:

determining, by the network device as the DRX parameter information of the terminal, DRX parameter information with a minimum DRX parameter value in DRX parameter information corresponding to the M groups of configuration parameters, where M is an integer, and 1<M≤N.

In one embodiment, information about the group of DRX parameters includes one or more of the following: parameter information of a first DRX state, parameter information of a second DRX state, and parameter information of a monitoring interval; and duration of the first DRX state is less than a first preset threshold, duration of the second DRX state is greater than a second preset threshold, and the monitoring interval is used to listen to a control channel of a cell accessed by the terminal.

A third aspect of this application provides a discontinuous reception method, where the method is applied to a communications system, the communications system supports N groups of configuration parameters, N is an integer greater than or equal to 2, and each group of configuration parameters is corresponding to a group of discontinuous reception DRX parameters; and the method includes:

determining, by a network device, a correspondence between a configuration parameter supported by a terminal and a DRX parameter; and sending, by the network device, the correspondence between the configuration parameter supported by the terminal and the DRX parameter to the terminal.

In one embodiment, the method further includes:

sending, by the network device to the terminal, configuration parameter information supported by the terminal.

In one embodiment, the method further includes:

determining, by the network device, DRX parameter information corresponding to the configuration parameter information supported by the terminal; and sending, by the network device to the terminal, the DRX parameter information corresponding to the configuration parameter information supported by the terminal.

In one embodiment, the determining, by the network device, DRX parameter information corresponding to the configuration parameter information supported by the terminal includes:

obtaining, by the network device based on the configuration parameter information supported by the terminal and the correspondence between the configuration parameter supported by the terminal and the DRX parameter, the DRX parameter information corresponding to the configuration parameter information supported by the terminal.

In one embodiment, if the terminal supports M groups of configuration parameters, the determining, by the network device, DRX parameter information corresponding to the configuration parameter information supported by the terminal includes:

determining, by the network device as the DRX parameter information of the terminal, DRX parameter information with a minimum DRX parameter value in DRX parameter information corresponding to the M groups of configuration parameters, where M is an integer, and 1<M≤N.

In one embodiment, information about the group of DRX parameters includes one or more of the following: parameter information of a first DRX state, parameter information of a second DRX state, and parameter information of a monitoring interval; and duration of the first DRX state is less than a first preset threshold, duration of the second DRX state is greater than a second preset threshold, and the monitoring interval is used to listen to a control channel of a cell accessed by the terminal.

A fourth aspect of this application provides a discontinuous reception method, where the method is applied to a communications system, the communications system supports N groups of configuration parameters, N is an integer greater than or equal to 2, and each group of configuration parameters is corresponding to a group of discontinuous reception DRX parameters; and the method includes:

determining, by a network device, configuration parameter information supported by a terminal; and sending, by the network device to the terminal, the configuration parameter information supported by the terminal.

In one embodiment, the network device determines DRX parameter information corresponding to the configuration parameter information supported by the terminal, and the network device sends, to the terminal, the DRX parameter information corresponding to the configuration parameter information supported by the terminal.

In one embodiment, the network device determines a correspondence between a configuration parameter supported by the terminal and a DRX parameter, and the network device sends the correspondence between the configuration parameter supported by the terminal and the DRX parameter to the terminal.

In one embodiment, that the network device determines DRX parameter information corresponding to the configuration parameter information supported by the terminal includes that the network device obtains, based on the configuration parameter information supported by the terminal and the correspondence between the configuration parameter supported by the terminal and the DRX parameter, the DRX parameter information corresponding to the configuration parameter information supported by the terminal.

In one embodiment, if the terminal supports M groups of configuration parameters, that the network device determines DRX parameter information corresponding to the configuration parameter information supported by the terminal includes that the network device determines, as the DRX parameter information of the terminal, DRX parameter information with a minimum DRX parameter value in DRX parameter information corresponding to the M groups of configuration parameters, where M is an integer, and 1<M≤N.

Information about the group of DRX parameters includes one or more of the following: parameter information of a first DRX state, parameter information of a second DRX state, and parameter information of a monitoring interval; and duration of the first DRX state is less than a first preset threshold, duration of the second DRX state is greater than a second preset threshold, and the monitoring interval is used to listen to a control channel of a cell accessed by the terminal.

In one embodiment, based on the first aspect to the fourth aspect, a minimum scheduling interval in the configuration parameter is in direct proportion to a value of the DRX parameter corresponding to the configuration parameter.

In one embodiment, the first preset threshold is less than the second preset threshold.

In one embodiment, that the terminal determines, as the DRX parameter information of the terminal, DRX parameter information with a minimum DRX parameter value in DRX parameters information corresponding to information about the M groups of configuration parameters includes that the terminal determines, as the DRX parameter of the terminal, a DRX parameter corresponding to a configuration parameter whose minimum scheduling interval is the smallest in the M groups of configuration parameters.

In one embodiment, when the DRX parameter includes a parameter of the monitoring interval, duration of the monitoring interval is m times of maximum duration of the minimum scheduling interval in the N groups of configuration parameters, and m is an integer greater than 0; or duration of the monitoring interval corresponding to each group of configuration parameters is m times of duration of the minimum scheduling interval in each group of configuration parameters, and m is an integer greater than 0.

A fifth aspect of this application provides a terminal, where the terminal is applied to a communications system, the communications system supports N groups of configuration parameters, N is an integer greater than or equal to 2, and each group of configuration parameters is corresponding to a group of discontinuous reception DRX parameters; and the terminal includes a module or a means (means) configured to perform the method provided in the first aspect and various implementations of the first aspect.

A sixth aspect of this application provides a network device, where the network device is applied to a communications system, the communications system supports N groups of configuration parameters, N is an integer greater than or equal to 2, and each group of configuration parameters is corresponding to a group of discontinuous reception DRX parameters; and the network device includes a module or a means (means) configured to perform the method provided in the second aspect and various implementations of the second aspect.

A seventh aspect of this application provides a network device, where the network device is applied to a communications system, the communications system supports N groups of configuration parameters, N is an integer greater than or equal to 2, and each group of configuration parameters is corresponding to a group of discontinuous reception DRX parameters; and the network device includes a module or a means (means) configured to perform the method provided in the third aspect and various implementations of the third aspect.

An eighth aspect of this application provides a network device, where the network device is applied to a communications system, the communications system supports N groups of configuration parameters, N is an integer greater than or equal to 2, and each group of configuration parameters is corresponding to a group of discontinuous reception DRX parameters; and the network device includes a module or a means (means) configured to perform the method provided in the fourth aspect and various implementations of the fourth aspect.

A ninth aspect of this application provides a terminal, where the terminal includes a processor and a memory, the memory is configured to store a program, and the processor invokes the program stored in the memory to perform the method provided in the first aspect of this application.

A tenth aspect of this application provides a network device, where the network device includes a processor and a memory, the memory is configured to store a program, and the processor invokes the program stored in the memory to perform the method provided in the second aspect of this application.

An eleventh aspect of this application provides a network device, where the network device includes a processor and a memory, the memory is configured to store a program, and the processor invokes the program stored in the memory to perform the method provided in the third aspect of this application.

A twelfth aspect of this application provides a network device, where the network device includes a processor and a memory, the memory is configured to store a program, and the processor invokes the program stored in the memory to perform the method provided in the fourth aspect of this application.

A thirteenth aspect of this application provides a terminal, including at least one processing element (or a chip) configured to perform the method according to the first aspect.

A fourteenth aspect of this application provides a network device, including at least one processing element (or a chip) configured to perform the method according to the second aspect.

A fifteenth aspect of this application provides a network device, including at least one processing element (or a chip) configured to perform the method according to the third aspect.

A sixteenth aspect of this application provides a network device, including at least one processing element (or a chip) configured to perform the method according to the fourth aspect.

A seventeenth aspect of this application provides a program, where the program is executed by a processor to perform the method according to the first aspect.

An eighteenth aspect of this application provides a program product, for example, a computer readable storage medium, including the program in the seventeenth aspect.

A nineteenth aspect of this application provides a program, where the program is executed by a processor to perform the method according to the second aspect.

A twentieth aspect of this application provides a program product, for example, a computer readable storage medium, including the program in the nineteenth aspect.

A twenty-first aspect of this application provides a program, where the program is executed by a processor to perform the method according to the third aspect.

A twenty-second aspect of this application provides a program product, for example, a computer readable storage medium, including the program in the twenty-first aspect.

A twenty-third aspect of this application provides a program, where the program is executed by a processor to perform the method according to the fourth aspect.

A twenty-fourth aspect of this application provides a program product, for example, a computer readable storage medium, including the program in the twenty-third aspect.

According to the discontinuous reception method, the terminal, and the network device provided in this application, the DRX parameter information corresponding to the configuration parameter information supported by the terminal is obtained, where the system to which the terminal belongs supports the N groups of configuration parameters, and each group of configuration parameters is corresponding to a group of DRX parameters. Then, the terminal enables the DRX by using the obtained DRX parameter information. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger system capacity, a lower latency, higher network reliability, and better network availability.

DESCRIPTION OF EMBODIMENTS

The following describes some terms in this application, to help a person skilled in the art have a better understanding.

A base station, also referred to as a radio access network (RAN) device, is a device that connects a terminal to a wireless network. The base station may be a base transceiver station (BTS) in a global system for mobile communications (GSM) or code division multiple access (CDMA); or may be a NodeB (NB) in wideband code division multiple access (WCDMA); or may be an evolved NodeB (eNB or eNodeB) in long term evolution (LTE), a relay station or an access point, a base station in a future 5th generation mobile communications technology (5G) network, or the like. This is not specifically limited herein.

A terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone), or a computer with a mobile terminal, such as a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone, a session initiation protocol (SIP) phone, a wireless local loop (WLL) station, or a personal digital assistant (PDA). The wireless terminal may also be referred to as a system, a subscriber unit, a subscriber station, a mobile station, a mobile console (mobile), a remote station, a remote terminal, an access terminal, a user terminal, a user agent, or user equipment. This is not limited herein.

In this application, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
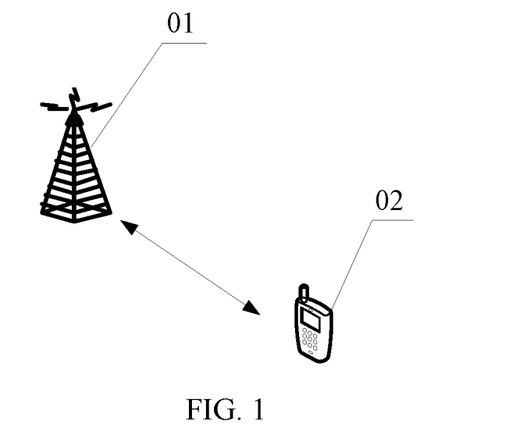
FIG. 1 is an architectural diagram of a communications system.

FIG. 1 is an architectural diagram of a communications system. As shown in FIG. 1, the communications system includes a base station 01 and a terminal 02.

The communications system may be an LTE communications system, or may be another future communications system. This is not limited herein.

The future communications system has better performance, for example: a larger system capacity, a lower latency, higher network reliability, and better network availability.

To better support diversity of future wireless communication services, a numerology (numerology) is introduced to the 5G system, in other words, a configuration of a plurality of basic parameters on a physical layer is supported in the 5G system. The system may select, based on a service supported by the system, a configuration which can support one or more numerologies exist at the same time, to better serve the terminal.

In addition to the basic parameters on the physical layer, this application mainly focuses on a problem that a current DRX parameter configuration cannot meet a requirement of a future communications network.

Figure 2:
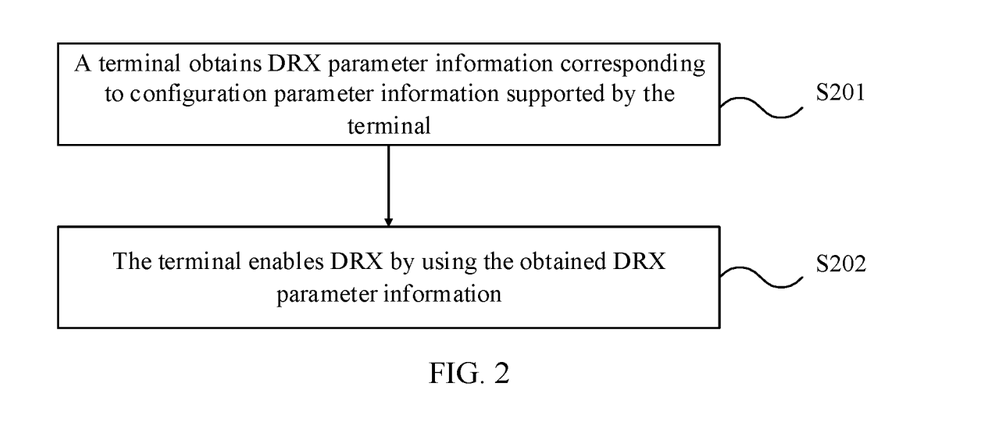
FIG. 2 is a schematic flowchart of a discontinuous reception method according to an embodiment of this application.

FIG. 2 is a schematic flowchart of a discontinuous reception method according to an embodiment of this application.

The method provided in this application is applied to a communications system that supports N groups of configuration parameters, where N is an integer greater than or equal to 2, and each group of configuration parameters is corresponding to a group of DRX parameters.

As shown in FIG. 2, the method includes the following operations.

Operation S201. A terminal obtains DRX parameter information corresponding to configuration parameter information supported by the terminal.

Operation S202. The terminal enables DRX by using the obtained DRX parameter information.

The terminal is usually in a continuous reception state when accessing a network. A network device determines, based on a current service status of the terminal, whether to enable a DRX function to make the terminal be in a discontinuous reception state, so as to reduce power consumption of the terminal.

In this application, before enabling the DRX, the terminal determines a DRX parameter currently used by the terminal. Then, the terminal enables the DRX.

In one embodiment, each group of configuration parameters is corresponding to a group of DRX parameters. Therefore, the terminal first determines the configuration parameter information supported by the terminal, and then determines a corresponding DRX parameter, to enable the DRX.

In one embodiment, the DRX parameter information corresponding to the configuration parameter information supported by the terminal is obtained, where the system to which the terminal belongs supports the N groups of configuration parameters, and each group of configuration parameters is corresponding to a group of DRX parameters. Then, the terminal enables the DRX by using the obtained DRX parameter information. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger system capacity, a lower latency, higher network reliability, and better network availability.

In one embodiment, a correspondence between a configuration parameter and a DRX parameter may be preconfigured for the terminal, for example, notified to the terminal by using a protocol or through preconfiguration. Alternatively, the correspondence may be notified to the terminal after the terminal accesses the network and before the DRX needs to be enabled. This is not limited herein.

In one embodiment, that a terminal obtains DRX parameter information corresponding to configuration parameter information supported by the terminal may be as follows: The terminal obtains the configuration parameter information supported by the terminal, and further obtains the DRX parameter information of the terminal based on the configuration parameter information supported by the terminal and a correspondence between a configuration parameter and a DRX parameter.

In one embodiment, the terminal obtains the correspondence between the configuration parameter and the DRX parameter. The correspondence between the configuration parameter and the DRX parameter may also be preconfigured for the terminal, or may be sent to the terminal by another device.

In one embodiment, the terminal receives the correspondence that is between the configuration parameter and the DRX parameter and that is sent by the network device. Alternatively, the terminal obtains the correspondence that is between the configuration parameter and the DRX parameter and that is preconfigured for the terminal.

The network device may send the correspondence between the configuration parameter and the DRX parameter to the terminal by using different implementations. In one implementation, configuration parameters supported by the terminal are preconfigured for the terminal, and the network device sends, to the terminal, an identifier of one or more groups of configuration parameters supported by the terminal, and DRX parameters corresponding to each group of configuration parameters. In another implementation, the network device directly sends, to the terminal, one or more groups of configuration parameters supported by the terminal, and DRX parameters corresponding to each group of configuration parameters.

A different identifier may be allocated to each group of configuration parameters supported by the system, and the identifier may be a number, a name, or the like of each group of configuration parameters. This is not limited herein.

In one embodiment, the network device may send the correspondence between the configuration parameter and the DRX parameter to the terminal by sending configuration signaling. To be specific, the network device sends the configuration signaling to the terminal, where the configuration signaling includes an identifier of one or more groups of configuration parameters supported by the terminal, and DRX parameters corresponding to each group of configuration parameters; or includes one or more groups of configuration parameters supported by the terminal, and DRX parameters corresponding to each group of configuration parameters.

In one embodiment, the configuration parameter information supported by the terminal may be notified by the network device. To be specific, the terminal obtains the configuration parameter information supported by the terminal. Specifically, the terminal obtains the configuration parameter information supported by the terminal and sent by the network device. The network device may send configuration signaling to the terminal. The configuration signaling includes one or more groups of configuration parameters supported by the terminal.

In one embodiment, the network device sends configuration signaling to the terminal in a unicast manner, or the network device broadcasts the configuration signaling.

In one embodiment, the network device may also indicate, to the terminal by using configuration signaling, the N groups of configuration parameters supported by the entire system and the DRX parameters corresponding to each group of configuration parameters. Certainly, to save network resources, the network device may notify only the configuration parameters supported by the terminal.

In one embodiment, the network device may be a base station accessed by the terminal, or may be another device in the network such as a network controller. This is not limited herein.

The configuration signaling may be radio resource control (Radio Resource Control, RRC) signaling, but is not limited thereto; or may be other control signaling.

Further, in still another embodiment, one or more groups of configuration parameters supported by the terminal, and DRX parameters corresponding to each group of configuration parameters are preconfigured for the terminal, and before enabling the DRX, the terminal needs only to obtain the one or more groups of configuration parameters supported by the terminal, and the DRX parameters corresponding to each group of configuration parameters. Optionally, that the terminal obtains a current DRX parameter based on a current configuration parameter may be as follows: The network device sends, to the terminal based on the correspondence between the configuration parameter and the DRX parameter, a DRX parameter corresponding to a configuration parameter supported by the terminal. To be specific, the terminal receives the current DRX parameter that is corresponding to the current configuration parameter and that is sent by the network device.

In one embodiment, the terminal may not know the one or more groups of configuration parameters supported by the terminal, and the correspondence between the configuration parameter and the DRX parameter. The network device determines a set of suitable DRX parameters based on configuration parameters currently used by the terminal, and sends the set of suitable DRX parameters to the terminal, and the terminal directly enables a DRX mode based on the received DRX parameters. To be specific, in this implementation, a network side may not indicate, to the terminal, a plurality of groups of configuration parameters currently used by the terminal and DRX parameters respectively corresponding to the configuration parameters. When the configuration parameter supported by the terminal changes, the network side updates the DRX parameter of the terminal, in other words, the network device redetermines a set of DRX parameters and sends the set of DRX parameters to the terminal, and the terminal enables a DRX state by using the updated DRX parameters.

In one embodiment, when instructing the terminal to use a group of configuration parameters, the network device also indicates DRX parameters corresponding to the group of configuration parameters. For example, the terminal receives indication information sent by the network device. The indication information includes: an identifier of one or more groups of configuration parameters supported by the terminal, and DRX parameters corresponding to each group of configuration parameters. Alternatively, the indication information includes: one or more groups of configuration parameters supported by the terminal, and DRX parameters corresponding to each group of configuration parameters.

Figure 3:
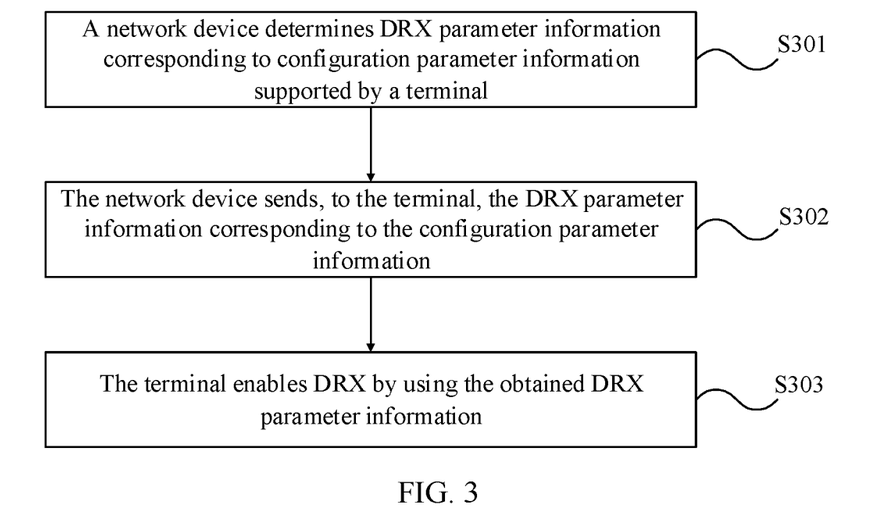
FIG. 3 is a schematic flowchart of a discontinuous reception method according to another embodiment of this application.

FIG. 3 is a schematic flowchart of a discontinuous reception method according to another embodiment of this application. In some optional embodiments, a network device sends one or more pieces of the following content to a terminal: configuration parameter information supported by the terminal, DRX parameter information corresponding to the configuration parameter information supported by the terminal, a correspondence between a configuration parameter and a DRX parameter, or the like. As shown in FIG. 3, the method includes:

Operation S301. The network device determines the DRX parameter information corresponding to the configuration parameter information supported by the terminal.

The network device may first obtain a configuration parameter supported by the terminal, and then determine the corresponding DRX parameter information based on the correspondence between the configuration parameter and the DRX parameter.

Operation S302. The network device sends, to the terminal, the DRX parameter information corresponding to the configuration parameter information.

Operation S303. The terminal enables DRX by using the obtained DRX parameter information.

Figure 4:
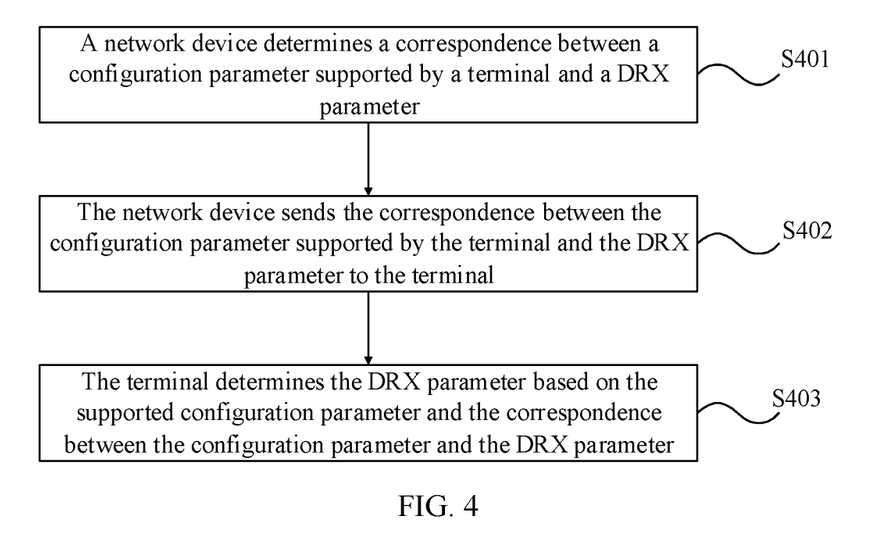
FIG. 4 is a schematic flowchart of a discontinuous reception method according to still another embodiment of this application.

FIG. 4 is a schematic flowchart of a discontinuous reception method according to still another embodiment of this application. As shown in FIG. 4, the method includes the following operations.

Operation S401. A network device determines a correspondence between a configuration parameter supported by a terminal and a DRX parameter.

Operation S402. The network device sends the correspondence between the configuration parameter supported by the terminal and the DRX parameter to the terminal.

Operation S403. The terminal determines the DRX parameter based on the supported configuration parameter and the correspondence between the configuration parameter and the DRX parameter.

The correspondence between the configuration parameter and the DRX parameter is used to indicate DRX parameter information corresponding to configuration parameter information.

In one embodiment, the supported configuration parameter may be preconfigured for the terminal, and after receiving the correspondence between the configuration parameter and the DRX parameter, the terminal may determine the DRX parameter based on the configuration parameter and the correspondence between the configuration parameter and the DRX parameter.

Operation S404. The terminal enables DRX by using obtained DRX parameter information.

On the basis of FIG. 3 and FIG. 4, the network device may further send, to the terminal, the configuration parameter supported by the terminal. Specifically, the configuration parameter supported by the terminal may be sent before S303 in the embodiment of FIG. 3 or before S403 in the embodiment of FIG. 4. This is not limited in this application.

In the foregoing embodiments, the network device indicates, to the terminal, the correspondence between the configuration parameter supported by the terminal and the DRX parameter, or the DRX parameter information corresponding to the configuration parameter information supported by the terminal. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger system capacity, a lower latency, higher network reliability, and better network availability.

Further, in some service scenarios, the terminal supports M groups of configuration parameters, where M is an integer, and $1<M\leq N$. In other words, the terminal uses a plurality of groups of configuration parameters at the same time.

The M groups of configuration parameters may be corresponding to a same DRX parameter or different DRX parameters. Therefore, the terminal needs to select a group of DRX parameters from the DRX parameters based on a preset rule, to enable the DRX.

In one embodiment, that the terminal obtains the DRX parameter information corresponding to the configuration parameter information supported by the terminal may be as follows: The terminal determines, as the DRX parameter information of the terminal, DRX parameter information with a minimum DRX parameter value in DRX parameter information corresponding to the M groups of configuration parameters.

Information about a group of DRX parameters may include one or more of the following: parameter information of a first DRX state, parameter information of a second DRX state, and parameter information of a monitoring interval. Duration of the first DRX state is less than a first preset threshold, and duration of the second DRX state is greater than a second preset threshold. Optionally, the first preset threshold is less than the second preset threshold. In other words, the first DRX state is a DRX state with relatively short duration, and the second DRX state is a DRX state with relatively long duration.

The parameter information of the first DRX state may include information such as a cycle length and a start time of the first DRX state. The parameter information of the second DRX state may include information such as a cycle length and a start time of the second DRX state. The parameter information of the monitoring interval (for example, On Duration) may include information such as duration information and a start time.

In one embodiment, information about a group of DRX parameters may include only parameter information of a first DRX state. Parameter information of a second DRX state may not be corresponding to a configuration parameter. Specifically, the parameter information of the second DRX state may use a set of preset values, or a set of fixed values notified by the network device to the terminal. This is not limited herein.

Parameter information of a monitoring interval may be parameter information of a monitoring interval corresponding to the first DRX state, and/or parameter information of a monitoring interval corresponding to the second DRX state.

After enabling the DRX, the terminal can listen to a downlink control channel only within the monitoring interval and check whether there is scheduling information of the terminal. If there is scheduling information of the terminal, the terminal enters a continuous reception (continuous reception) state.

It should be noted that content included in information about each group of DRX parameters may be a specific value, or may be a range. This is not limited herein. For example, the cycle length of the first DRX state may be a range value, and so on. Details are not described herein.

Figure 5:
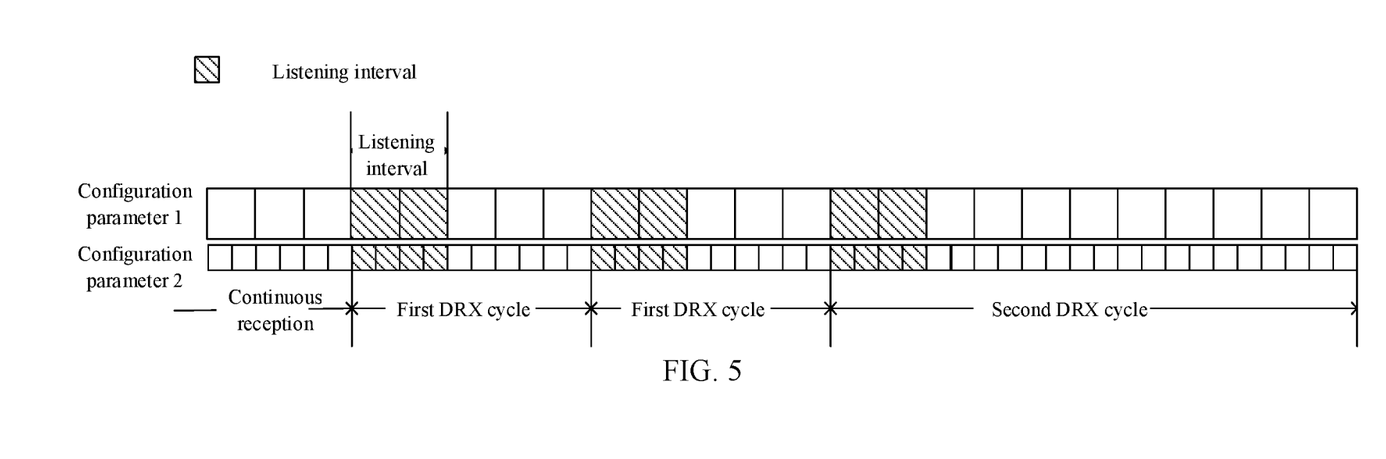
FIG. 5 is a schematic diagram of a reception cycle in a discontinuous reception method according to an embodiment of this application.

FIG. 5 is a schematic diagram of a reception cycle in a discontinuous reception method according to an embodiment of this application.

The configuration parameter may be shown in Table 1. Table 1 shows nine groups of configuration parameters (each column is a group of configuration parameters), and the nine groups of configuration parameters are respectively identified by numbers 1 to 9. For example, each group of configuration parameters includes one or more of the following items: a subcarrier spacing, a symbol length, a normal cyclic prefix, normal maximum bandwidth, a maximum fast Fourier transform size, a minimum scheduling interval (measured by using a symbol), a minimum scheduling interval (measured by using a slot), and a minimum scheduling interval (measured by using a time). Last two rows in Table 1 respectively indicate parameter information (a short DRX cycle) of a first DRX state corresponding to each group of configuration parameters, and parameter information (a long DRX cycle) of a second DRX state corresponding to each group of configuration parameters.

TABLE 1

| Group identifier | 1 | 2 | 3 | 4 | 5 | 6 | 7 | 8 | 9 |
| --- | --- | --- | --- | --- | --- | --- | --- | --- | --- |
| Sub carrier spacing [kHz] | 3.75 | 7.5 | 15 | 30* | 60* | 120* | 240* | 480* | 960* |
| Symbol length [μs] | 267 | 133 | 66.7 | 33.3 | 16.7 | 8.33 | 4.17 | 2.08 | 1.04 |
| Normal cyclic prefix [μs] | 19 | 9.4 | 4.7 | 2.3 | 1.2 | 0.59 | 0.29 | 0.15 | — |
| Normal maximum bandwidth [MHz] | 5 | 10/12 | 20/25 | 40/50 | 80/100 | 160/200 | 320/400 | 640/800 | 1280/1600 |
| Maximum fast Fourier transform size | 2048 | 2048 | 2048 | 2048 | 2048 | 2048 | 2048 | 2048 | 2048 |
| Minimum scheduling interval (symbols) | 7 | 7 | 7 | 7 | 7 | 14 | 28 | 56 | 120 |
| Minimum scheduling interval (slots) | 1 | 1 | 1 | 1 | 1 | 1 | 2 | 4 | 8 |
| Minimum scheduling interval (ms) | 2 | 1 | 0.5 | 0.25 | 0.125 | 0.125 | 0.125 | 0.125 | 0.125 |
| Short DRX cycle | SDC 1 | SDC 2 | SDC 3 | SDC 4 | SDC 5 | SDC 6 | SDC 7 | SDC 8 | SDC 9 |
| Long DRX cycle | LDC 1 | LDC 2 | LDC 3 | LDC 4 | LDC 5 | LDC 6 | LDC 7 | LDC 8 | LDC 9 |

FIG. 5 shows reception cycles corresponding to any two groups of configuration parameters (denoted as a configuration parameter 1 and a configuration parameter 2). After accessing a network, a terminal first enters a continuous reception state, and then enables DRX. Specifically, the terminal first enters a shorter first DRX cycle, and then enters a longer second DRX cycle. Optionally, the first DRX cycle may be repeated a plurality of times. An example in which the first DRX cycle is repeated two times is shown in FIG. 5. If the terminal receives no service in the first DRX cycle, in other words, the terminal is not scheduled, the terminal may enter the second DRX cycle.

Further, the configuration parameter may further include a minimum scheduling interval (Min scheduling interval). The minimum scheduling interval may be measured by using duration (for example, in a unit of millisecond or ms), or may be measured by using a symbol, or may be measured by using a slot, or the like.

The minimum scheduling interval measured by using duration is a fixed value, and duration of the minimum scheduling interval is used as a reference for subsequent comparison with a DRX parameter.

Generally, in a plurality of groups of configuration parameters, duration of a minimum scheduling interval is in direct proportion to a value of a DRX parameter corresponding to a configuration parameter to which the minimum scheduling interval belongs.

Configuration parameters whose minimum scheduling intervals have same duration are corresponding to a same DRX parameter.

The duration of the minimum scheduling interval is in direct proportion to the value of the DRX parameter corresponding to the configuration parameter to which the minimum scheduling interval belongs. Therefore, it can be learned that SDC 1:2=SDC 2:1=SDC 3:0.5=SDC 4:0.25=SDC 5:0.125, and it can be further learned that SDC 1>SDC 2>SDC 3>SDC 4>SDC 5.

In addition, minimum scheduling intervals of groups 5 to 9 have same duration. Therefore, values of the SDC 5 to an SDC 9 are the same.

An LDC 1 to an LDC 9 also comply with a similar rule. Details are not described herein.

If only the parameter information of the first DRX state is corresponding to the configuration parameter, a unified preset value may be used for the LDC 1 to the LDC 9. This is not limited herein.

Specific parameters corresponding to the LDC and the SDC may be specific values, or may be ranges. This is not limited herein.

Further, that the terminal determines, as the DRX parameter information of the terminal, DRX parameter information with a minimum DRX parameter value in DRX parameter information corresponding to the M groups of configuration parameters may include: The terminal determines a configuration parameter whose minimum scheduling interval has shortest duration in the M groups of configuration parameters, and then the terminal further determines, as the DRX parameter information of the terminal, DRX parameter information corresponding to configuration parameter whose minimum scheduling interval has the shortest duration.

It is assumed that the terminal currently uses a configuration parameter 1 and a configuration parameter 3 in Table 1, duration of a minimum scheduling interval of the configuration parameter 1 is 2, and duration of a minimum scheduling interval of the configuration parameter 3 is 0.5. In this case, DRX parameter information corresponding to the configuration parameter 3 is selected as the DRX parameter information of the terminal. In other words, the SDC 3 is selected as the parameter information of the first DRX state of the terminal, and the LDC 3 is selected as the parameter information of the second DRX state of the terminal.

In one embodiment, when the DRX parameter includes a parameter of a monitoring interval, duration of the monitoring interval is m times of maximum duration of the minimum scheduling interval in the N groups of configuration parameters. To be specific, the monitoring interval used by each group of DRX parameters is a unified value, and is m times of the maximum duration of the minimum scheduling interval in the N groups of configuration parameters.

Alternatively, monitoring duration corresponding to each group of configuration parameters is m times of duration of the minimum scheduling interval in each group of configuration parameters. To be specific, the monitoring interval of each group of DRX parameters is corresponding to the duration of the minimum scheduling interval in each group of configuration parameters.

Herein, m is an integer greater than 0. For example, m may be 1, 2, 3, or the like. This is not limited herein.

Further, after the terminal determines, as the DRX parameter information of the terminal, the DRX parameter information corresponding to the configuration parameter whose minimum scheduling interval has the shortest duration, the terminal may further determine, based on maximum duration of the minimum scheduling interval in the M groups of configuration parameters, a quantity of times of starting the first DRX cycle.

In one embodiment, the maximum duration of the minimum scheduling interval in the M groups of configuration parameters is q times of minimum duration, so that the short DRX cycle may be started q times. This is not limited herein.

For example, the terminal simultaneously uses the configuration parameter 1, the configuration parameter 2, and the configuration parameter 3 that are shown in Table 1. The duration of the minimum scheduling interval of the configuration parameter 3 is the shortest. The duration of the minimum scheduling interval of the configuration parameter 1 is the longest, and is four times of the duration of the minimum scheduling interval of the configuration parameter 3. A first DRX cycle corresponding to the configuration parameter 3 is used as a current first DRX cycle. Therefore, the first DRX cycle may be started four times.

Figure 6:
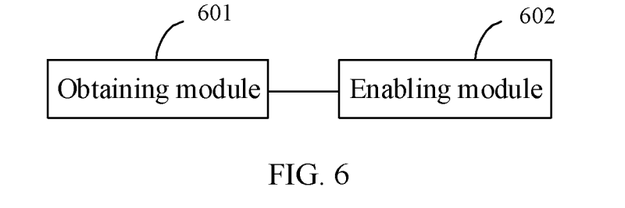
FIG. 6 is a schematic structural diagram of a terminal according to an embodiment of this application.

FIG. 6 is a schematic structural diagram of a terminal according to an embodiment of this application. The terminal is a terminal in the foregoing communications system. The communications system supports N groups of configuration parameters, where N is an integer greater than or equal to 2. Each group of configuration parameters is corresponding to a group of discontinuous reception DRX parameters. As shown in FIG. 6, the terminal includes an obtaining module 601 and an enabling module 602.

The obtaining module 601 is configured to obtain discontinuous reception DRX parameter information corresponding to configuration parameter information supported by the terminal.

The enabling module 602 is configured to enable DRX by using the obtained DRX parameter information.

In one embodiment, the DRX parameter information corresponding to the configuration parameter information supported by the terminal is obtained. The system to which the terminal belongs supports the N groups of configuration parameters, and each group of configuration parameters is corresponding to a group of DRX parameters. Then, the terminal enables the DRX by using the obtained DRX parameter information. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger system capacity, a lower latency, higher network reliability, and better network availability.

In one embodiment, the obtaining module 601 is specifically configured to: obtain the configuration parameter information supported by the terminal, and obtain the DRX parameter information of the terminal based on the configuration parameter information supported by the terminal and a correspondence between a configuration parameter and a DRX parameter.

Further, the obtaining module 601 is further configured to obtain the correspondence between the configuration parameter and the DRX parameter.

Optionally, the obtaining module 601 is specifically configured to: receive the correspondence that is between the configuration parameter and the DRX parameter and that is sent by a network device, or obtain the correspondence that is between the configuration parameter and the DRX parameter and that is preconfigured for the terminal.

In one embodiment, the obtaining module 601 is specifically configured to obtain the configuration parameter information supported by the terminal and sent by the network device.

In one embodiment, the obtaining module 601 is specifically configured to receive the DRX parameter information that is corresponding to the configuration parameter information supported by the terminal and that is sent by a network device.

Further, if the terminal supports M groups of configuration parameters, the obtaining module 601 determines, as the DRX parameter information of the terminal, DRX parameter information with a minimum DRX parameter value in DRX parameter information corresponding to the M groups of configuration parameters, where M is an integer, and 1<M≤N.

In one embodiment, information about the group of DRX parameters includes one or more of the following: parameter information of a first DRX state, parameter information of a second DRX state, and parameter information of a monitoring interval. Duration of the first DRX state is less than a first preset threshold, duration of the second DRX state is greater than a second preset threshold, and the monitoring interval is used to listen to a control channel of a cell accessed by the terminal.

The terminal may be configured to perform the method provided in the foregoing method embodiments. Specific implementations and technical effects thereof are similar to those of the methods, and details are not described herein again.

Figure 7:
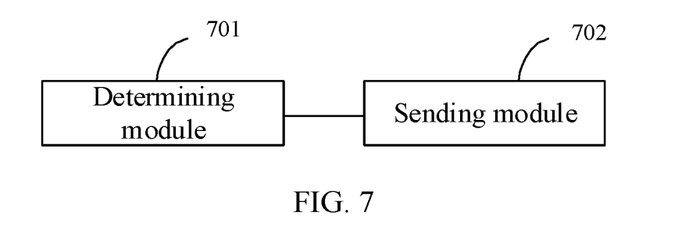
FIG. 7 is a schematic structural diagram of a network device according to an embodiment of this application.

FIG. 7 is a schematic structural diagram of a network device according to an embodiment of this application. The network device is a network device in the foregoing communications system. The communications system supports N groups of configuration parameters, where N is an integer greater than or equal to 2. Each group of configuration parameters is corresponding to a group of discontinuous reception DRX parameters. As shown in FIG. 7, the network device includes a determining module 701 and a sending module 702.

The determining module 701 is configured to determine DRX parameter information corresponding to configuration parameter information supported by a terminal.

The sending module 702 is configured to send, to the terminal, the DRX parameter information corresponding to the configuration parameter information supported by the terminal.

In one embodiment, the network device determines the DRX parameter information corresponding to the configuration parameter information supported by the terminal, and sends, to the terminal, the DRX parameter information corresponding to the configuration parameter information supported by the terminal, so that the terminal enables the DRX based on the DRX parameter information corresponding to the configuration parameter information supported by the terminal. The system to which the network device belongs supports the N groups of configuration parameters, and each group of configuration parameters is corresponding to a group of DRX parameters. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger system capacity, a lower latency, higher network reliability, and better network availability.

In one embodiment, the determining module 701 is specifically configured to: obtain the configuration parameter information supported by the terminal, and obtain, based on the configuration parameter information supported by the terminal and a correspondence between a configuration parameter and a DRX parameter, the DRX parameter information corresponding to the configuration parameter information supported by the terminal.

In one embodiment, the sending module 702 is further configured to send the correspondence between the configuration parameter and the DRX parameter to the terminal.

If the terminal supports M groups of configuration parameters, the determining module 701 is specifically configured to determine, as the DRX parameter information of the terminal, DRX parameter information with a minimum DRX parameter value in DRX parameter information corresponding to the M groups of configuration parameters, where M is an integer, and 1<M≤N.

In one embodiment, information about the group of DRX parameters includes one or more of the following: parameter information of a first DRX state, parameter information of a second DRX state, and parameter information of a monitoring interval. Duration of the first DRX state is less than a first preset threshold, duration of the second DRX state is greater than a second preset threshold, and the monitoring interval is used to listen to a control channel of a cell accessed by the terminal.

Figure 8:
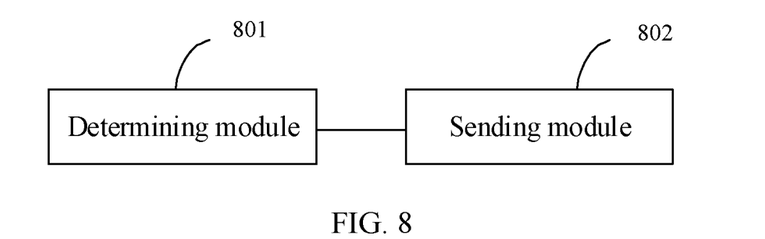
FIG. 8 is a schematic structural diagram of a network device according to another embodiment of this application.

FIG. 8 is a schematic structural diagram of a network device according to another embodiment of this application. The network device is a network device in the foregoing communications system. The communications system supports N groups of configuration parameters, where N is an integer greater than or equal to 2. Each group of configuration parameters is corresponding to a group of discontinuous reception DRX parameters. As shown in FIG. 8, the network device includes a determining module 801 and a sending module 802.

The determining module 801 is configured to determine a correspondence between a configuration parameter supported by a terminal and a DRX parameter.

The sending module 802 is configured to send the correspondence between the configuration parameter supported by the terminal and the DRX parameter to the terminal.

In one embodiment, the network device determines the correspondence between the configuration parameter supported by the terminal and the DRX parameter, and sends the correspondence between the configuration parameter supported by the terminal and the DRX parameter to the terminal, so that the terminal determines corresponding DRX parameter information based on the correspondence between the configuration parameter supported by the terminal and the DRX parameter, and enables the DRX. The system to which the network device belongs supports the N groups of configuration parameters, and each group of configuration parameters is corresponding to a group of DRX parameters. A DRX parameter is corresponding to a configuration parameter, and the DRX parameter is adaptively and flexibly adjusted when the configuration parameter is flexibly adjusted based on a service in a network, so that the terminal is better balanced between a latency and power consumption, and the terminal can better adapt to a communications network with a larger system capacity, a lower latency, higher network reliability, and better network availability.

In one embodiment, the sending module 802 is further configured to send, to the terminal, configuration parameter information supported by the terminal.

In one embodiment, the determining module 801 is further configured to determine DRX parameter information corresponding to the configuration parameter information supported by the terminal. Correspondingly, the sending module 802 sends, to the terminal, the DRX parameter information corresponding to the configuration parameter information supported by the terminal.

In one embodiment, the determining module 801 is specifically configured to obtain, based on the configuration parameter information supported by the terminal and the correspondence between the configuration parameter supported by the terminal and the DRX parameter, the DRX parameter information corresponding to the configuration parameter information supported by the terminal.

If the terminal supports M groups of configuration parameters, M is an integer, and 1<M≤N, the determining module 801 is specifically configured to determine, as the DRX parameter information of the terminal, DRX parameter information with a minimum DRX parameter value in DRX parameter information corresponding to the M groups of configuration parameters.

In one embodiment, information about the group of DRX parameters includes one or more of the following: parameter information of a first DRX state, parameter information of a second DRX state, and parameter information of a monitoring interval. Duration of the first DRX state is less than a first preset threshold, duration of the second DRX state is greater than a second preset threshold, and the monitoring interval is used to listen to a control channel of a cell accessed by the terminal.

The foregoing devices may be configured to perform the methods in the foregoing method embodiments. Specific implementations and technical effects thereof are similar to those of the methods, and details are not described herein again.

It should be noted that the foregoing division of modules of the terminal and the network device is merely logical function division, and during actual implementation, some or all modules may be integrated into one physical entity, or the modules may be physically separated. In addition, all the modules may be implemented by invoking software by a processing element, or all the modules may be implemented by hardware, or some modules may be implemented by invoking software by a processing element, and some modules may be implemented by hardware. For example, the determining module may be an independently disposed processing element, or may be integrated into a chip of the foregoing apparatus for implementation. In addition, the determining module may alternatively be stored in a memory of the foregoing apparatus in a form of program code, and is invoked by a processing element of the foregoing apparatus, to execute the foregoing functions of the determining module. Other modules are implemented in a similar manner. In addition, all or some of the modules may be integrated, or may be implemented independently. The processing element herein may be an integrated circuit with a signal processing capability. In an implementation process, the steps of the foregoing methods or the foregoing modules may be implemented by using an integrated logic circuit of hardware in the processor element, or by using a software instruction.

For example, the foregoing modules may be configured as one or more integrated circuits that implement the foregoing methods, such as one or more application-specific integrated circuits (ASIC), one or more microprocessors (for example, a digital signal processor, DSP), or one or more field programmable gate arrays (FPGA). For another example, when one of the foregoing modules is implemented by invoking program code by a processing element, the processing element may be a general purpose processor, such as a central processing unit (CPU), or another processor that can invoke the program code. For still another example, these modules may be integrated together and implemented in a system-on-a-chip (SOC) form.

Figure 9:
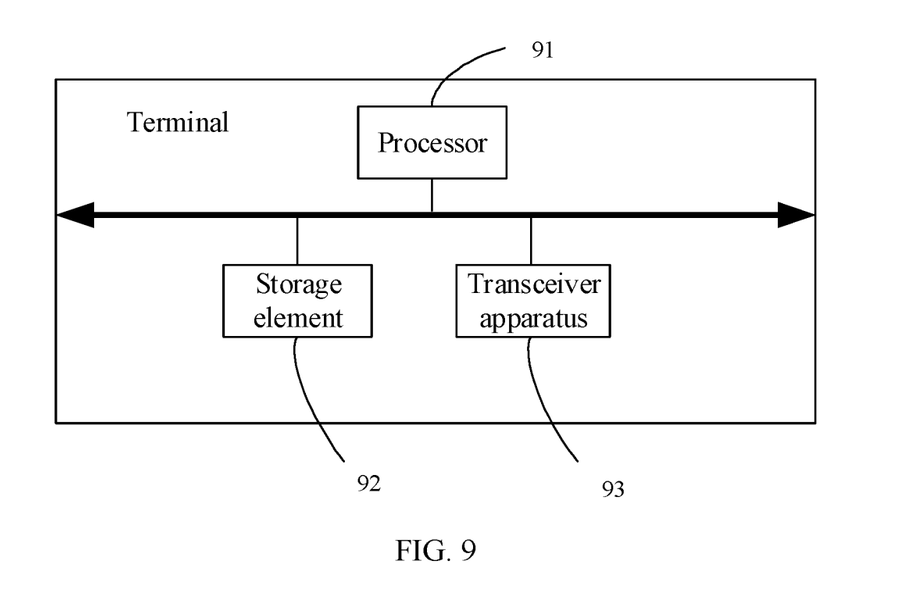
FIG. 9 is a schematic structural diagram of a terminal according to another embodiment of this application.

FIG. 9 is a schematic structural diagram of a terminal according to another embodiment of this application. The terminal is a terminal in the foregoing communications system. The communications system supports N groups of configuration parameters, where N is an integer greater than or equal to 2. Each group of configuration parameters is corresponding to a group of discontinuous reception DRX parameters.

Referring to FIG. 9, the terminal includes a processor 91, a storage element 92, and a transceiver apparatus 93.

The transceiver apparatus 93 may be connected to an antenna. In a downlink direction, the transceiver apparatus 93 receives, by using the antenna, information sent by a base station, and sends the information to the processor 91 for processing. In an uplink direction, the processor 91 processes data of the terminal, and sends the processed data to the base station by using the transceiver apparatus 93.

The storage element 92 is configured to store program code that implements the foregoing method embodiments or the modules in the embodiment shown in FIG. 6. The processor 91 invokes the program code to perform an operation in the foregoing method embodiments, so as to implement the modules in the embodiment shown in FIG. 6.

Alternatively, some or all of the foregoing modules may be embedded on a chip of the terminal in a form of a field programmable gate array (FPGA) for implementation. The modules may be implemented separately or may be integrated together.

The processing element herein is similar to that described above, and may be a general purpose processor, such as a CPU, or may be configured as one or more integrated circuits that implement the foregoing methods, such as one or more application-specific integrated circuits (ASIC), one or more microprocessors (for example, a digital signal processor, DSP), or one or more field programmable gate arrays (FPGA). The storage element may be one storage apparatus or may be a collective name for a plurality of storage elements.

In addition, a plurality of interfaces may be provided on the processor, and each are configured to connect to a peripheral device or an interface circuit that is connected to a peripheral device. For example, the interfaces include an interface for connecting to a display, an interface for connecting to a camera, an interface for connecting to an audio processing element, and the like.

Figure 10:
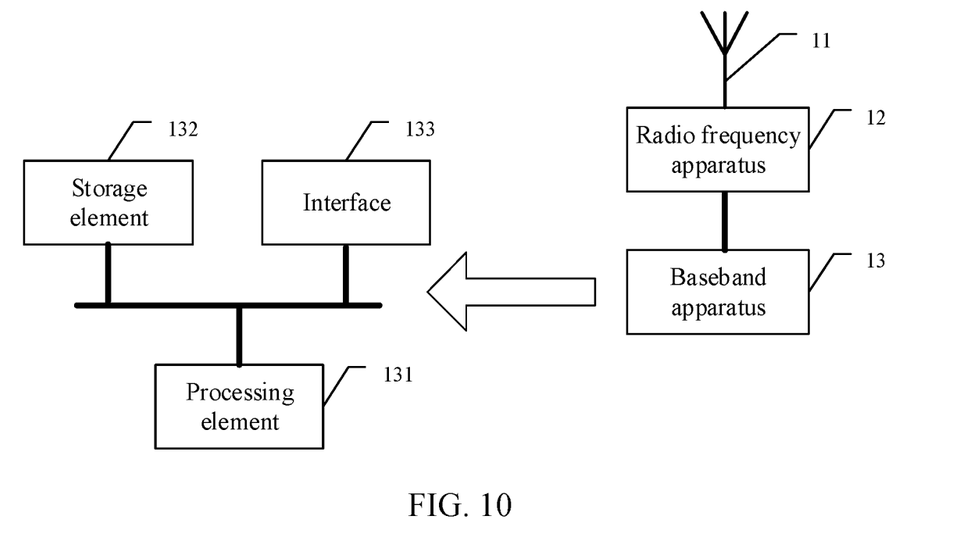
FIG. 10 is a schematic structural diagram of a network device according to another embodiment of this application.

FIG. 10 is a schematic structural diagram of a network device according to another embodiment of this application. The network device is a network device in the foregoing communications system. The communications system supports N groups of configuration parameters, where N is an integer greater than or equal to 2. Each group of configuration parameters is corresponding to a group of discontinuous reception DRX parameters.

As shown in FIG. 10, the network device includes an antenna 11, a radio frequency apparatus 12, and a baseband apparatus 13. The antenna 11 is connected to the radio frequency apparatus 12. In an uplink direction, the radio frequency apparatus 12 receives information by using the antenna 11, and sends the received information to the baseband apparatus 13 for processing. In a downlink direction, the baseband apparatus 13 processes to-be-sent information, and sends processed information to the radio frequency apparatus 12. After processing the received information, the radio frequency apparatus 12 sends processed information by using the antenna 11.

The methods provided in the foregoing embodiments may be implemented in the baseband apparatus 13. The baseband apparatus 13 includes a processing element 131 and a storage element 132. For example, the baseband apparatus 13 may include at least one baseband processing unit. A plurality of chips are disposed on the baseband processing unit. As shown in FIG. 10, for example, one of the chips is the processing element 131 and is connected to the storage element 132, to invoke a program in the storage element 132, so as to perform an operation shown in the foregoing method embodiments.

The baseband apparatus 13 may further include an interface 133, configured to exchange information with the radio frequency apparatus 12. For example, the interface is a common public radio interface (CPRI).

The processing element herein may be one processor, or may be a collective name for a plurality of processing elements. For example, the processing element may be a CPU or an ASIC, or may be configured as one or more integrated circuits that implement the foregoing methods, such as one or more microprocessors (for example, DSPs), or one or more field programmable gate arrays FPGAs. The storage element may be a memory, or may be a collective name for a plurality of storage elements.

What is claimed is:

1. A discontinuous reception method, comprising:
obtaining, by a terminal, discontinuous reception (DRX) parameter information corresponding to configuration parameter information supported by the terminal in a communications system that supports N groups of configuration parameters, and each group of configuration parameters corresponding to a group of DRX parameters, wherein N is an integer greater than or equal to 2; and
enabling, by the terminal, DRX by using the obtained DRX parameter information,
wherein if the terminal supports M groups of configuration parameters, the obtaining, by a terminal, the DRX parameter information corresponding to the configuration parameter information supported by the terminal comprises:
determining, by the terminal as the DRX parameter information of the terminal, a DRX parameter with a minimum DRX parameter value in the DRX parameter information corresponding to the M groups of configuration parameters, wherein M is in integer, and 1<M≤N;
wherein the determining, by the terminal as the DRX parameter information of the terminal, the DRX parameter with the minimum DRX parameter value in the DRX parameter information comprises: determining, by the terminal, a configuration parameter whose minimum scheduling interval has shortest duration in the M groups of configuration parameters.

2. The method according to claim 1, wherein the obtaining, by a terminal, discontinuous reception DRX parameter information corresponding to configuration parameter information supported by the terminal comprises:
obtaining, by the terminal, the configuration parameter information supported by the terminal; and
obtaining, by the terminal, the DRX parameter information of the terminal based on the configuration parameter information supported by the terminal and a correspondence between a configuration parameter and a DRX parameter.

3. The method according to claim 2, wherein the method further comprises:
obtaining, by the terminal, the correspondence between the configuration parameter and the DRX parameter.

4. The method according to claim 3, wherein the obtaining, by the terminal, the correspondence between the configuration parameter and the DRX parameter comprises:
receiving, by the terminal, the correspondence that is between the configuration parameter and the DRX parameter and that is sent by a network device; or
obtaining, by the terminal, the correspondence that is between the configuration parameter and the DRX parameter and that is preconfigured for the terminal.

5. The method according to claim 2, wherein the obtaining, by the terminal, the configuration parameter information supported by the terminal comprises:
obtaining, by the terminal, the configuration parameter information supported by the terminal and sent by the network device.

6. The method according to claim 1, wherein the obtaining, by a terminal, discontinuous reception DRX parameter information corresponding to configuration parameter information supported by the terminal comprises:
receiving, by the terminal, the DRX parameter information that is corresponding to the configuration parameter information supported by the terminal and the DRX parameter information sent by a network device.

7. The method according to claim 1, wherein information about the group of DRX parameters comprises one or more of the following: parameter information of a first DRX state, parameter information of a second DRX state, or parameter information of a monitoring interval; and
duration of the first DRX state is less than a first preset threshold, duration of the second DRX state is greater than a second preset threshold, and the monitoring interval is used to listen to a control channel of a cell accessed by the terminal.

8. A discontinuous reception method, comprising:
determining, by a network device, discontinous reception (DRX) parameter information corresponding to configuration parameter information supported by a terminal in a communication system that supports N groups of configuration parameters, and each group of configuration parameters corresponding to a group of DRX parameters, wherein N is an integer greater than or equal to 2; and
sending, by the network device to the terminal, the DRX parameter information corresponding to the configuration parameter information supported by the terminal,
wherein if the terminal supports M groups of configuration parameters, the determining, by the network device, the (DRX) parameter information corresponding to configuration parameter information supported by a terminal comprises:
determining, by the network device as the DRX parameter information of the terminal, a DRX parameter with a minimum DRX parameter value in the DRX parameter information corresponding to the M groups of configuration parameters, wherein M is an integer, and 1<M≤N,
wherein the determining, by the network device as the DRX parameter information of the terminal, the DRX parameter with the minimum DRX parameter value in the DRX parameter information comprises: determining, by the network device, a configuration parameter whose minimum scheduling interval has shortest duration in the M groups of configuration parameters.

9. The method according to claim 8, wherein the determining, by a network device, DRX parameter information corresponding to configuration parameter information supported by a terminal comprises:
obtaining, by the network device, the configuration parameter information supported by the terminal; and
obtaining, by the network device based on the configuration parameter information supported by the terminal and a correspondence between a configuration parameter and a DRX parameter, the DRX parameter information corresponding to the configuration parameter information supported by the terminal.

10. The method according to claim 8, wherein the method further comprises:
sending, by the network device, the correspondence between the configuration parameter and the DRX parameter to the terminal.

11. The method according to claim 8, wherein information about the group of DRX parameters comprises one or more of the following: parameter information of a first DRX state, parameter information of a second DRX state, or parameter information of a monitoring interval; and
duration of the first DRX state is less than a first preset threshold, duration of the second DRX state is greater 12. A discontinuous reception method, configuring:
    determining, by a network device, a correspondence between a configuration parameter supported by a terminal and a DRX parameter in a communications system that supports N groups of configuration parameters, and each group of configuration parameters corresponding to a group of DRX parameters, wherein N is an integer greater than or equal to 2; and
    sending, by the network device, the correspondence between the configuration parameter supported by the terminal and the DRX parameter to the terminal,
    wherein if the terminal supports M groups of configuration parameters, the determining, by the network device, the (DRX) parameter information corresponding to configuration parameter information supported by a terminal comprises:
    determining, by the network device as the DRX parameter information of the terminal, a DRX parameter with a minimum DRX parameter value in the DRX parameter information corresponding to the M groups of configuration parameters, wherein M is an integer, and 1<M≤N; and
    wherein the determining, by the network device as the DRX parameter information of the terminal, the DRX parameter with the minimum DRX parameter value in the DRX parameter information comprises: determining, by the network device, a configuration parameter whose minimum scheduling interval has shortest duration in the M groups of configuration parameters.

13. The method according to claim 12, wherein the method further comprises:
    sending, by the network device to the terminal, configuration parameter information supported by the terminal.

14. The method according to claim 12, wherein the method further comprises:
    determining, by the network device, DRX parameter information corresponding to the configuration parameter information supported by the terminal; and
    sending, by the network device to the terminal, the DRX parameter information corresponding to the configuration parameter information supported by the terminal.

15. The method according to claim 14, wherein the determining, by the network device, DRX parameter information corresponding to the configuration parameter information supported by the terminal comprises:
    obtaining, by the network device based on the configuration parameter information supported by the terminal and the correspondence between the configuration parameter supported by the terminal and the DRX parameter, the DRX parameter information corresponding to the configuration parameter information supported by the terminal.

16. The method according to claim 12, wherein information about the group of DRX parameters comprises one or more of the following: parameter information of a first DRX state, parameter information of a second DRX state, or parameter information of a monitoring interval; and
    duration of the first DRX state is less than a first preset threshold, duration of the second DRX state is greater than a second preset threshold, and the monitoring interval is used to listen to a control channel of a cell accessed by the terminal.

17. A terminal, comprising:
    processor, and
    a memory coupled to the processor and having processor-executable instructions stored thereon, which when executed by the processor, cause the processor to:
    obtain discontinuous reception DRX parameter information corresponding to configuration parameter information supported by the terminal in a communications system that supports N groups of configuration parameters, and each group of configuration parameters corresponding to a group of DRX parameters, wherein N is an integer great than or equal to 2; and
    enable DRX by using the obtained DRX parameter information,
    wherein if the terminal supports M groups of configuration parameters, the obtaining, by a terminal, the DRX parameter information corresponding to the configuration parameter information supported by the terminal comprises:
    determining, by the terminal as the DRX parameter information of the terminal, a DRX parameter with a minimum DRX parameter value in the DRX parameter information corresponding to the M groups of configuration parameters, wherein M is an integer, and 1<M≤N;
    wherein the determining by the terminal as the DRX parameter information of the terminal, the DRX parameter with the minimum DRX parameter value in the DRX parameter information comprises: determining, by the terminal, a configuration parameter whose minimum scheduling interval has shortest duration in the M groups of configuration parameters.

18. A network device, comprising:
    processor, and
    a memory coupled to the processor and having processor-executable instructions stored thereon, which when executed by the processor, cause the processor to:
    determine a correspondence between a configuration parameter supported by a terminal and a discontinuous reception DRX parameter in a communications system that supports N groups of configuration parameters, and each group of configuration parameters corresponding to a group of DRX parameters, wherein N is an integer greater than or equal to 2; and
    send the correspondence between the configuration parameter supported by the terminal and the DRX parameter to the terminal,
    wherein if the terminal supports M groups of configuration parameters, the determining, by the network device, the (DRX) parameter information corresponding to configuration parameter information supported by a terminal comprises:
    determining, by the network device as the DRX parameter information of the terminal, a DRX parameter with a minimum DRX parameter value in the DRX parameter information corresponding to the M groups of configuration parameters, wherein M is an integer, and 1<M≤N,
    wherein the determining, by the network device as the DRX parameter information of the terminal, the DRX parameter with the minimum DRX parameter value in the DRX parameter information comprises: determining, by the network device, a configuration parameter whose minimum scheduling interval has shortest duration in the M groups of configuration parameters.

19. A non-transitory machine-readable storage medium having stored thereon processor-executable instructions, which when executed by a processor of a device, cause the device to implement a method for:

obtaining, by a terminal, DRX parameter information corresponding to configuration parameter information supported by the terminal in a communications system that supports N groups of configuration parameters, and each group of configuration parameters corresponding to a group of DRX parameter, wherein N is an integer greater than or equal to 2; and enabling, by the terminal, DRX by using the obtained DRX parameter information, wherein if the terminal supports M groups of configuration parameters, the obtaining, by a terminal, the DRX parameter information corresponding to the configuration parameter information supported by the terminal comprises:

determining, by the terminal as the DRX parameter information of the terminal, a DRX parameter with a minimum DRX parameter value in the DRX parameter information corresponding to the M groups of configuration parameters, wherein M is an integer, and $1 < M \leq N$;

wherein the determining, by the terminal as the DRX parameter information of the terminal, the DRX parameter with the minimum DRX parameter value in the DRX information comprises: determining, by the terminal, a configuration parameter whose minimum scheduling interval as shortest duration in the M groups of configuration parameters.

20. A non-transitory machine-readable storage medium having stored thereon processor-executable instructions, which when executed by a processor of a device, cause the device to implement a method for:

determining, by a network device, a correspondence between a configuration parameter supported by a terminal and a DRX parameter in a communications system that supports N groups of configuration parameters, and each group of configuration parameters corresponding to a group of DRX parameters, wherein N is an integer greater than or equal to 2; and sending, by the network device, the correspondence between the configuration parameter supported by the terminal and the DRX parameter to the terminal, wherein if the terminal supports M groups of configuration parameters, the determining, by the network device, the (DRX) parameter information corresponding to configuration parameter information supported by a terminal comprises:

determining, by the network device as the DRX parameter information of the terminal, a DRX parameter with a minimum DRX parameter value in the DRX parameter information correspdonging to the M groups of configuration parameter, wherein M is an integer, and $1 < M \leq N$;

wherein the determining, by the network device as the DRX parameter information foo the terminal, the DRX parameter with the minimum DRX parameter value in the DRX parameter information comprises: determining, by the network device, a configuration parameter whose minimum scheduling interval has shortest duration in the M groups of configuration parameters.

* * * * *

UNITED STATES PATENT AND TRADEMARK OFFICE
CERTIFICATE OF CORRECTION

PATENT NO. : 11,026,288 B2
APPLICATION NO. : 16/547988
DATED : June 1, 2021
INVENTOR(S) : Xie et al.

Page 1 of 2

It is certified that error appears in the above-identified patent and that said Letters Patent is hereby corrected as shown below:

In the Claims

Claim 1, Column 21, Line 23, "wherein M is in integer," should be --wherein M is an integer,--.

Claim 8, Column 21, Line 14, "by a network device, discontinous reception" should be --by a network device, discontinuous reception--.

Claim 8, Column 21, Line 17, "in a communication system" should be --in a communications system--.

Claim 12, Column 23, Line 4, "A discontinuous reception method, configuring:" should be --A discontinuous reception method comprising:--.

Claim 12, Column 23, Line 26, "and" should be deleted.

Claim 17, Column 24, Line 26, "wherein the determining by the terminal" should be --wherein the determining, by the terminal--.

Claim 19, Column 25, Line 8, "DRX parameter, wherein" should be --DRX parameters, wherein--.

Claim 19, Column 25, Line 26, "DRX information comprises:" should be --DRX parameter information comprises"--.

Claim 19, Column 25, Line 28, "interval as shortest duration" should be --interval has shortest duration--.

Claim 20, Column 26, Line 21, "correspdonging" should be --corresponding--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*

Claim 20, Column 26, Line 22, "parameter" should be --parameters--.

Claim 20, Column 26, Line 25, "foo" should be --of--.